(12) United States Patent
Kang et al.

(10) Patent No.: US 11,565,500 B2
(45) Date of Patent: Jan. 31, 2023

(54) SANDWICH PANEL HAVING ANTICLASTIC CURVATURE CHARACTERISTIC AND MANUFACTURING METHOD OF SAME

(71) Applicant: INDUSTRY FOUNDATION OF CHONNAM NATIONAL UNIVERSITY, Gwangju (KR)

(72) Inventors: Ki Ju Kang, Jeollanam-do (KR); Eun Byeol Park, Gwangju (KR); Ga Eun Kim, Yeosu-Si (KR)

(73) Assignee: INDUSTRY FOUNDATION OF CHONNAN NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 17/267,970

(22) PCT Filed: Jun. 21, 2019

(86) PCT No.: PCT/KR2019/007494
§ 371 (c)(1),
(2) Date: Apr. 12, 2021

(87) PCT Pub. No.: WO2020/036302
PCT Pub. Date: Feb. 20, 2020

(65) Prior Publication Data
US 2022/0088901 A1    Mar. 24, 2022

(30) Foreign Application Priority Data
Aug. 16, 2018  (KR) .......... 10-2018-0095408

(51) Int. Cl.
*B32B 7/022*    (2019.01)
*B32B 5/02*    (2006.01)
(Continued)

(52) U.S. Cl.
CPC .............. *B32B 7/022* (2019.01); *B32B 5/024* (2013.01); *B32B 37/14* (2013.01); *B32B 38/00* (2013.01);
(Continued)

(58) Field of Classification Search
CPC ....................................................... B32B 3/12
See application file for complete search history.

(56) References Cited

U.S. PATENT DOCUMENTS

| 4,859,517 A * | 8/1989 | Hull ................. B32B 5/18 428/116 |
| 2011/0214560 A1 | 9/2011 | Skertchly |
| 2015/0027629 A1* | 1/2015 | Butler ................. G10K 11/168 156/306.6 |

FOREIGN PATENT DOCUMENTS

| JP | 2000-219164 A | 8/2000 |
| KR | 10-1995-0012781 B1 | 10/1995 |

(Continued)

OTHER PUBLICATIONS

International Search Report for PCT/KR2019/007494 dated Sep. 24, 2019 from Korean Intellectual Property Office.
(Continued)

*Primary Examiner* — Lawrence D Ferguson
(74) *Attorney, Agent, or Firm* — Paratus Law Group, PLLC

(57) ABSTRACT

Disclosed are a sandwich panel capable of being advantageously applied to a body wearable device, and a method of manufacturing the same. The sandwich panel includes: a core; and face sheets attached to both surfaces of the core, wherein the face sheet is made of a two-dimensional auxetic material. The core has a neutral surface in accordance with bending moment and is made of a porous material. The face sheet is made of metal, polymer, ceramic, or a composite material, and has higher density, strength, and rigidity than
(Continued)

the core. The method includes: processing face sheets; and attaching the face sheets to both surfaces of a core, wherein the face sheet is processed to have a two-dimensional auxetic structure.

8 Claims, 10 Drawing Sheets

(51) Int. Cl.
  *B32B 37/14* (2006.01)
  *B32B 38/00* (2006.01)
(52) U.S. Cl.
  CPC ..... *B32B 2250/40* (2013.01); *B32B 2305/026* (2013.01)

(56) References Cited

FOREIGN PATENT DOCUMENTS

| KR | 10-2010-0004761 A | 1/2010 |
|---|---|---|
| KR | 10-2010-0021174 A | 2/2010 |
| KR | 10-2012-0117499 A | 10/2012 |
| KR | 10-2014-0094050 A | 7/2014 |
| KR | 10-2016-0080430 A | 7/2016 |

OTHER PUBLICATIONS

Yanping Liu et al., "A review on auxetic structures and polymeric materials", Scientific Research and Essays, May 18, 2010, pp. 1052-1063, vol. 5, No. 10.
A Alderson et al., "Auxetic materials", IMechE part G: J. Aerospace Engineering, Feb. 27, 2007, pp. 565-575, vol. 221.
Juan Carlos Álvarez Elipe et al., "Comparative study of auxetic geometries by means of computer-aided design and engineering", Smart Material and Structures, article id. 105004, Jun. 27, 2012, pp. 1-12, vol. 21.
Roderic Lakes, "Foam Structures with a Negative Poisson's Ratio", Science, 1987, pp. 1038-1040, vol. 235.
Z. Wang et al., "Auxetic composites in aerospace engineering", Advanced Composite Materials for Aerospace Engineering, 2016, pp. 1-29.
Chinese Office Action for related CN Application No. 201980055789.1 dated May 30, 2022 from Chinese Intellectual Property Office.

* cited by examiner

SANDWICH PANEL HAVING ANTICLASTIC CURVATURE CHARACTERISTIC AND MANUFACTURING METHOD OF SAME

CROSS-REFERENCE TO PRIOR APPLICATIONS

This application is a National Stage Patent Application of PCT International Patent Application No. PCT/KR2019/007494 (filed on Jun. 21, 2019) under 35 U.S.C. § 371, which claims priority to Korean Patent Application No. 10-2018-0095408 (filed on Aug. 16, 2018), which are all hereby incorporated by reference in their entirety.

BACKGROUND

The present disclosure relates to a sandwich panel and a method of manufacturing the same, and more particularly, to a sandwich panel capable of being advantageously applied to a body wearable device, and a method of manufacturing the same.

It is expected in the near future that mobile devices will evolve into body wearable devices. The body wearable device needs to be light in weight, to have structural strength, to be flexible, and to be excellent in body adhesion and wearability. In particular, because most of the human body parts, such as muscles of buttocks, chests, arms, or legs, to which the body wearable device is expected to be attached, have convex shapes, the body wearable device needs to be flexibly deformed to have a shape corresponding to the convex shape of the corresponding body part in order to increase adhesion of the body wearable device to the human body.

In this case, the deformation of the body wearable device, which occurs when the body wearable device comes into contact with the convex human body part, may be recognized as deformation caused by bending moment, and the deformation characteristics resulting from the bending moment and the body adhesion derived from the deformation characteristics may vary depending on a material to be used. Specifically, FIGS. 1A and 1B illustrate two types of deformation that occur when z-directional bending moment acts on a wide plate-shaped structural material on an x-z plane. As illustrated in FIG. 1A, a general solid structural material having a positive (+) Poisson's ratio has anticlastic curvature deformation characteristics in which bending caused by bending moment occurs in opposite directions on an x-y plane and a y-z plane. When the plate-shaped structural material having the anticlastic curvature deformation characteristics is applied to the body wearable device, the adhesion to the convex body part is not good. In contrast, as illustrated in FIG. 1B, a solid structural material having a negative Poisson's ratio, such as an auxetic material to be described below, has synclastic curvature deformation characteristics in which bending caused by bending moment occurs in the same direction on the x-y plane and the y-z plane, and when the plate-shaped structural material having the synclastic curvature deformation characteristics is applied to the body wearable device, the adhesion is excellent (Y. Liu and H. Hu, Scientific Research and Essays Vol. 5, pp. 1052-1063, 2010. A. Alderson and K. L. Alderson Proc. IMechE Part G: J. Aerospace Engineering, Vol. 221, pp. 565-575, 2007).

In general, when a material is stretched, the material is contracted in a direction perpendicular to the stretching direction. On the contrary, when the material is compressed, the material is stretched in a direction perpendicular to the compressing direction. That is, the deformation (longitudinal deformation) in a direction of application of a load and the deformation (lateral deformation) in the direction perpendicular to the direction of the application of the load are opposite to each other. A general material has a positive (+) Poisson's ratio defined by adding a negative (−) value to a ratio of the lateral deformation to the longitudinal deformation and has the deformation characteristics resulting from the bending moment as illustrated in FIG. 1A. In contrast, a material having a specific structure has a negative (−) Poisson's ratio, and this material is called an auxetic material. The auxetic material may have a two-dimensional structure or a three-dimensional structure, and the structure is found in a wide range from a microscopic level such as a molecular structure to a macroscopic level of several centimeters. FIGS. 2 and 3 are a two-dimensional structural view and a three-dimensional structural view of a representative auxetic material known in the related art (Juan Carlos A' lvarez Elipe and Andre's D'iaz Lantada, Smart Mater. Struct., Vol. 21, article id. 105004, 2012).

In this case, the two-dimensional auxetic material or structure refers to a structure which is two-dimensional and deformed only in a plane, and the three-dimensional auxetic structure refers to a structure in which both the structure and the deformation are defined in a three-dimensional space.

The two-dimensional auxetic material or the three-dimensional auxetic material has an inherent name depending on a geometric structure thereof. Further, it is known that an open foam material may have characteristics of the auxetic material when the open foam material is compressed in three directions perpendicular to one another and deformed into a re-entrant structure (R. S. Lakes, Science, Vol. 235, pp. 1038-1040, 1987).

However, in order to implement synclastic curvature deformation characteristics, as illustrated in FIG. 1B, in the case of configuring the plate-shaped structural material only with the auxetic material, the three-dimensional auxetic material illustrated in FIGS. 3A-3D needs to be used, but the two-dimensional auxetic material illustrated in FIGS. 2A-2H cannot be used. This is because, specifically, as illustrated in FIGS. 4A-4C, in order to implement the synclastic curvature deformation characteristics when bending moment $M_z$ is applied in a z-axis direction, a portion of the plate-shaped structural material having a predetermined thickness, to which tensile stress is applied in an x-axis direction at an upper side of a neutral surface, needs to be tensilely deformed even in the z-direction perpendicular to the x-axis direction, and a portion of the plate-shaped structure, to which compressive stress is applied in the x-axis direction at a lower side of the neutral surface, needs to be compressively deformed even in the z-direction perpendicular to the x-axis direction, but the two-dimensional auxetic material is deformed only uniformly in a thickness direction, and different types of deformation behavior do not occur in an upward/downward direction based on the neutral surface of the bending moment positioned in the thickness. However, even in a case in which a plate-shaped structural material for a body wearable device is manufactured only with the three-dimensional auxetic material, unit cells of the three-dimensional auxetic material need to be very finely formed in order to implement the synclastic curvature deformation characteristics by deforming upper and lower portions, which have a relatively small thickness, in opposite directions based on the neutral surface of the bending moment, which causes an increase in manufacturing difficulty, an excessive decrease in strength of the structural material, and as a result, there is a practical limitation in applying the structural material to the body wearable device.

Meanwhile, a sandwich panel refers to a structure generally made of different materials including a thick porous/low-strength core, and thin high-density/high-strength face sheets attached to both surfaces of the core. It is known that the sandwich panel is designed such that the face sheets are responsible for bending moment, and the core is responsible for relative low shearing force, such that the sandwich panel has high strength and high rigidity in comparison with a weight thereof. Recently, studies on the sandwich panel in which the core is made of the auxetic material and the face sheet is made of a conventional material have been reported as an example of applying the auxetic material to the sandwich panel. However, the sandwich panel having this structure is provided to manufacture a board having high resistance against impact or having a curved shape but is not related to improvement of deformation characteristics in accordance with bending moment.

SUMMARY

An object of the present disclosure is to provide a sandwich panel which is light in weight and thin, has required strength and rigidity, and has synclastic curvature deformation characteristics when being flexibly deformed, such that the sandwich panel may be advantageously applied as a structural material for a body wearable device, and to provide a method of manufacturing the same.

In a process of researching a method of utilizing a sandwich panel made by laminating and attaching different types of materials as a structural material for a body wearable device related to the problem to be solved, the present inventors have completed the present disclosure by ascertaining that in the case of configuring a sandwich panel in a form in which two-dimensional auxetic materials, as face sheets, are attached to both surfaces of a conventional core, it is possible to manufacture the light weight/thin sandwich panel, and in particular, the entire sandwich panel has predetermined strength and rigidity required for the body wearable device and has synclastic curvature deformation characteristics as the two-dimensional auxetic materials attached to both surfaces of the core expand in opposite directions at upper and lower sides of a neutral surface of bending moment, and as a result, it is possible to implement even excellent wearability, and by recognizing that it is possible to overcome the practical limitation in that in the case of simply configuring a sandwich panel with a thin plate-shaped structural material using a three-dimensional auxetic material, manufacturing difficulty is increased, and strength of the structural material is excessively decreased, which obstructs the application of the auxetic material to the body wearable device. The subject matters of the present disclosure based on the recognition and the knowledge in respect to the solution are as follows.

(1) A sandwich panel including: a core; and face sheets attached to both surfaces of the core, wherein the face sheet is made of a two-dimensional auxetic material.

(2) The sandwich panel according to (1), in which the core has a neutral surface in accordance with bending moment.

(3) The sandwich panel according to (1), in which the core is made of a porous material.

(4) The sandwich panel according to (1), in which the core is made of any one of polymer, ceramic, and metal.

(5) The sandwich panel according to (1), in which the face sheet is made of metal, polymer, ceramic, or a composite material.

(6) The sandwich panel according to (1), in which the face sheet has higher density, strength, and rigidity than the core.

(7) A method of manufacturing a sandwich panel, the method comprising: processing face sheets; and attaching the face sheets to both surfaces of a core, wherein the face sheet is processed to have a two-dimensional auxetic structure.

(8) The method according to (7), in which the processing of the face sheet having the two-dimensional auxetic structure is performed by performing linear cutting processing using a laser, an electron beam, discharge, or a water jet, or performing photolithography, press processing, or etching on a sheet-shaped base material.

(9) The method according to (7), wherein the processing of the face sheet having the two-dimensional auxetic structure is performed by weaving a unidirectional composite material or forming an angle-ply laminate structure.

Since the sandwich panel according to the present disclosure has the configuration in which the two-dimensional auxetic materials, as the face sheets, are attached to both surfaces of the conventional core, it is possible to manufacture the light weight/thin sandwich panel, provide predetermined strength and rigidity, and improve adhesion to an adherend by providing behavior of synclastic curvature deformation, in response to bending moment, comparable to the behavior of the three-dimensional auxetic material, such that the sandwich panel may be advantageously used as a structural material for a body wearable device. In addition, since the sandwich panel is simply manufactured at a low cost by pre-processing the two-dimensional auxetic material in the form of the face sheet, and simply attaching the two-dimensional auxetic material to the conventional core and since it is possible to provide behavior comparable to the behavior of the three-dimensional auxetic material, it is possible to easily overcome the practical limitation in that in the case of simply configuring a sandwich panel with a thin plate-shaped structural material using a three-dimensional auxetic material in the related art, manufacturing difficulty is increased, and strength of the structural material is excessively decreased, which obstructs the application of the auxetic material to the body wearable device. In addition, the sandwich panel has a beautiful external shape, mechanical and physical properties are easily adjusted depending on combinations of materials and structures of the face sheets and the core, and the sandwich panel is remarkably easy to manufacture. In addition, the use of a conductive face sheet may provide a function of receiving or blocking radio signals.

DETAILED DESCRIPTION

Figure 1A:
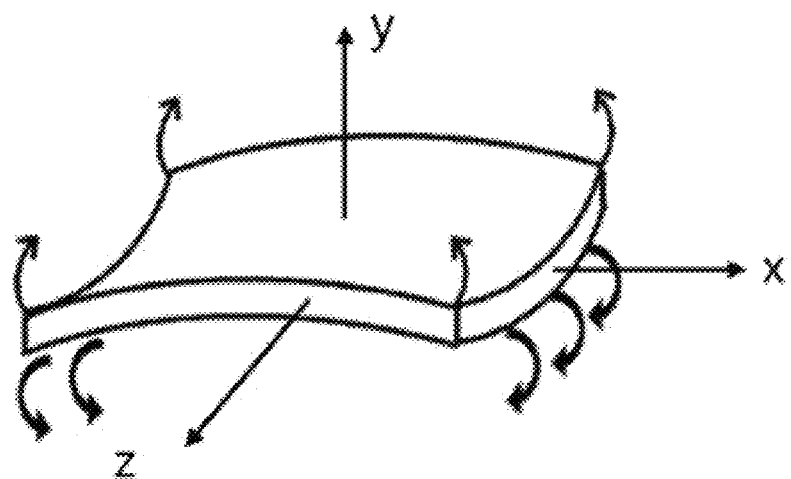
FIGS. 1A and 1B are schematic views related to deformation characteristics of a plate-shaped structural material in accordance with application of z-direction bending moment.

Hereinafter, the present disclosure will be described in detail with reference to the exemplary embodiments. In addition, terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own invention by the best method. Therefore, the configurations of the exemplary embodiments disclosed in the present specification are just the best preferred exemplary embodiments of the present disclosure and do not represent all the technical spirit of the present disclosure. Accordingly, it should be appreciated that various equivalents and modified examples capable of substituting the exemplary embodiments may be made at the time of filing the present application. Meanwhile, the same or similar constituent elements and the equivalents thereof will be designated by the same or similar reference numerals. Further, throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

Figure 5A:
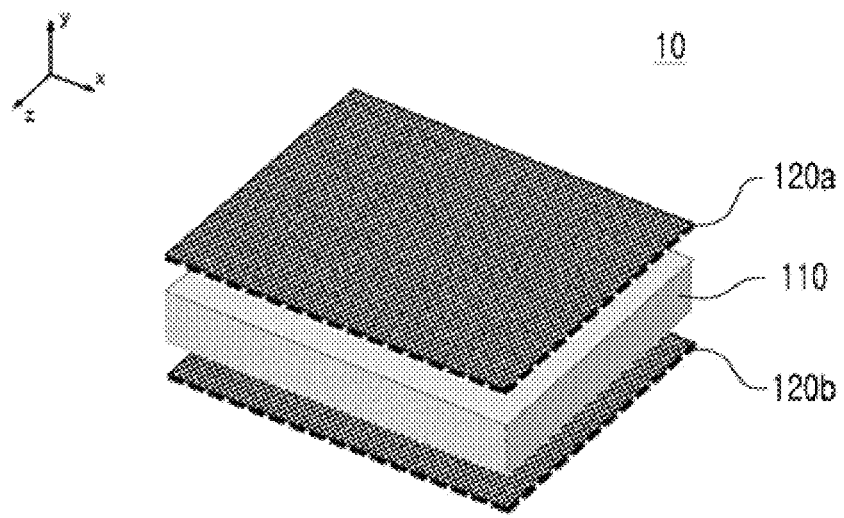
FIGS. 5A and 5B are structural views illustrating a sandwich panel according to an exemplary embodiment of the present disclosure.
Figure 5B:
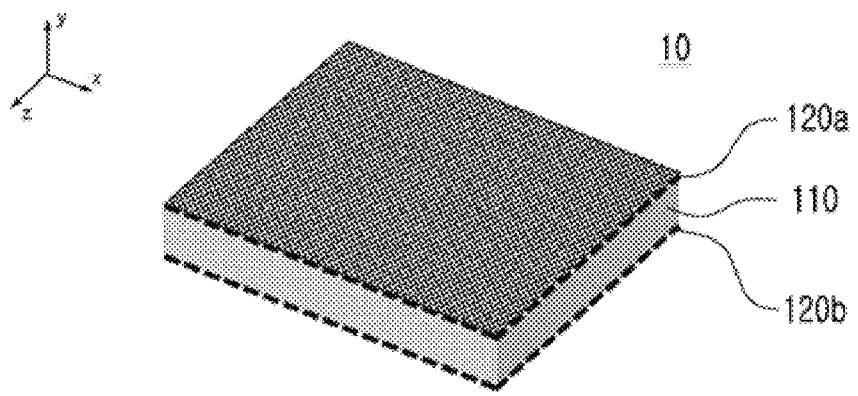

FIGS. 5A and 5B are structural views illustrating a sandwich panel 10 according to an exemplary embodiment of the present disclosure. The sandwich panel 10 includes a core 110; and face sheets 120a and 120b attached to both surfaces of core 110.

The core 110 serves to support the upper face sheet 120a and the lower face sheet 120b and divide, based on a sandwich thickness direction, the upper face sheet 120a and the lower face sheet 120b into separate volume elements on the basis of a neutral surface CF of bending moment. The material of the core 110 is not particularly limited as long as the material of the core 10 is a flexibly deformable material when the core 110 is thin, and particularly, the core 110 may be made of lightweight porous polymer or may also be made of metal. Further, recently, ceramic, which is generally known as a hard brittle material, is also flexibly deformable when the ceramic is manufactured to have a nano-thickness, and thus the core 110 according to the present disclosure may be made of ceramic. In addition, in terms of reduction in weight, the core 110 may be made of a porous material or a low-density material. When the core 110 made of the porous or low-density material is used, the core 110 has low rigidity than the face sheets 120a and 120b, that is, the core 110 becomes flexible, and the Poisson's ratio becomes close to zero, such that when the face sheets 120a and 120b are expansively deformed, the core 110 is constrained by the face sheets 120a and 120b and thus easily deformed together with the face sheets 120a and 120b. However, the core 110 may be relatively determined in relation to the face sheets 120a and 120b. For example, a material, which is a flexibility material but is an incompressible solid material, such as rubber, having a Poisson's ratio of +0.5 and thus may constrain the expansive deformation of the face sheets 120a and 120b, may not be suitable for a material of the core 110.

Figure 1B:
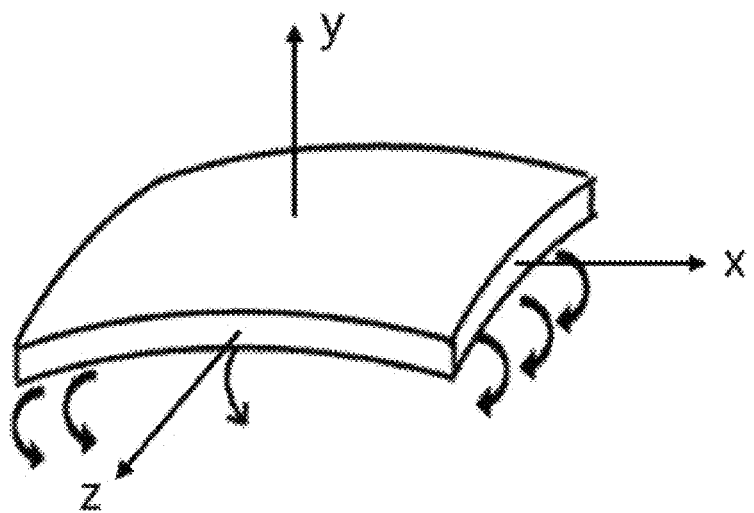

The face sheets 120a and 120b define upper and lower volume elements based on the neutral surface CF of the bending moment in a thickness direction of the sandwich panel 10 and serve to three-dimensional auxetic material characteristics to the entire sandwich panel 10, thereby providing synclastic curvature deformation characteristics in accordance with FIG. 1B when the bending moment is applied. To this end, the face sheets include the upper face sheet 120a and the lower face sheet 120b provided in a pair, and each of the face sheets is made of a two-dimensional auxetic material.

A geometric structure of the two-dimensional auxetic material constituting the face sheets 120a and 120b is not particularly limited, and may be provided, for example, in various forms illustrated in FIGS. 2A-2H. In addition, the geometric structures of the two-dimensional auxetic materials of the upper face sheet 120a and the lower face sheet 120b may be identical to or different from each other. In addition, the materials of the face sheets 120a and 120b are also not particularly limited and may be selected in consideration of a degree of flexible deformation required for application to a body wearable device, a method of processing the two-dimensional geometric structure to be described below, and the like. Particularly, the face sheets 120a and 120b may be made of, for example, polymer, ceramic, or composite materials in addition to metal, which is a material having high density, high strength/rigidity than the material of the core 110.

Figure 6A:
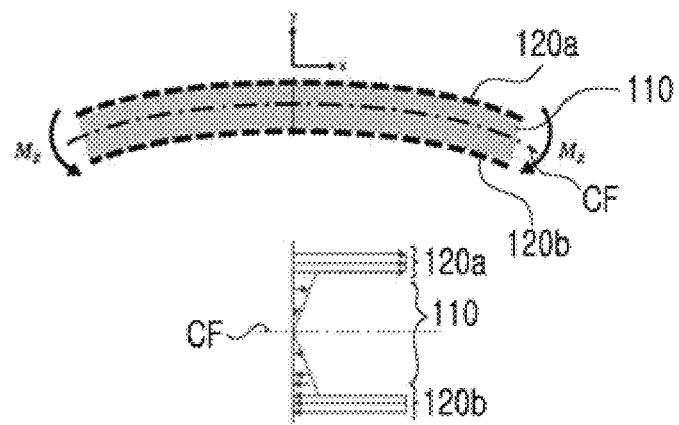
FIGS. 6A to 6C are schematic views related to deformation characteristics of the sandwich panel according to the exemplary embodiment of the present disclosure when z-direction bending moment is applied.
Figure 6B:
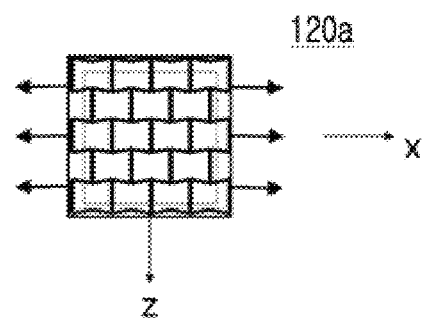
Figure 6C:
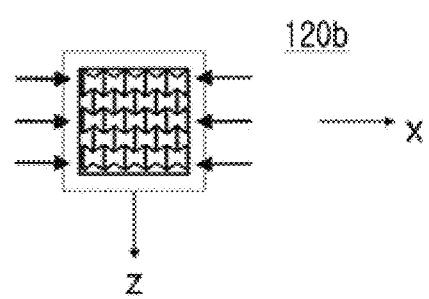

FIGS. 6A to 6C are schematic views related to deformation characteristics when z-direction bending moment is applied to the sandwich panel 10 according to the exemplary embodiment of the present disclosure. As illustrated in FIG. 6A, when the z-axis direction bending moment $M_z$ is applied to the sandwich panel 10 having a predetermined thickness by the core 110 and the pair of face sheets 120a and 120b attached to both surfaces of the core 110, the neutral surface CF in accordance with the bending moment is formed in the core 110, such that the upper face sheet 120a and the lower face sheet 120b define the upper and lower volume elements in the thickness direction of the sandwich panel 10. In this case, the position at which the neutral surface CF is formed may be affected by the thickness and the Young's modulus of the upper face sheet 120a and the lower face sheet 120b, and by adjusting the factors, the position at which the neutral surface CF is formed may be disposed in the core 110. The upper face sheet 120a having the geometric structure of the two-dimensional auxetic material receives tensile stress in an x-axis direction and is also tensilely deformed in the z-direction perpendicular to the x-axis direction, such that the upper face sheet 120a is isotropically stretched on an x-z plane, as illustrated in FIG. 6B. On the contrary, the lower face sheet 120b having the geometric structure of another two-dimensional auxetic material receives compressive stress in the x-axis direction and is also compressively deformed in the z-direction perpendicular to the x-axis direction, such that the lower face sheet 120b is isotropically contracted on the x-z plane, as illustrated in FIG. 6C. As a result, when the bending moment is applied, the isotropic stretching and the isotropic compressive deformation performed independently on the upper face sheet 120a and the lower face sheet 120b, which are divided into the separate volume elements based on the neutral surface CF in the thickness direction of the sandwich panel 10, allows the sandwich panel 10 to macroscopically have synclastic curvature deformation characteristics as illustrated in FIG. 1B, and this makes it possible to induce the same deformation behavior as in the case in which the plate-shaped structural material is formed only with the auxetic material illustrated in FIGS. 3A-3D in which microscopic control is performed on the unit cell to meet the thin thickness.

Meanwhile, the sandwich panel 10 according to the present disclosure may be manufactured by a simple method including processing the face sheets 120a and 120b; and attaching the processed face sheets 120a and 120b to both surfaces of the core 110. In this case, the processing of the face sheets 120a and 120b is performed to allow the face sheets 120a and 120b to have the two-dimensional auxetic structures and may be performed in various ways.

Figure 2A:
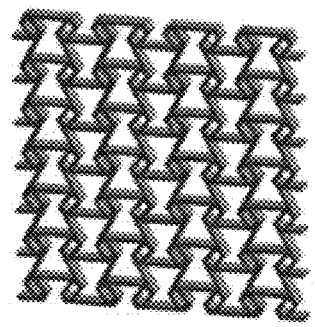
FIGS. 2A to 2H are structural views illustrating two-dimensional auxetic materials according to examples known in the related art.
Figure 2B:
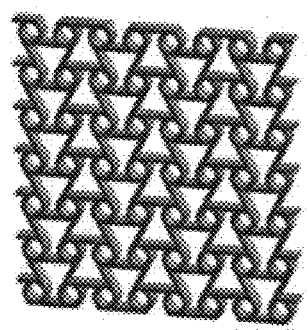
Figure 2C:
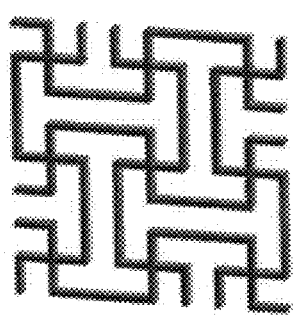
Figure 2D:
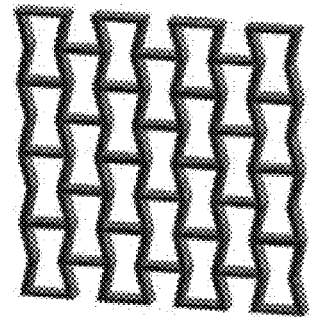
Figure 2E:
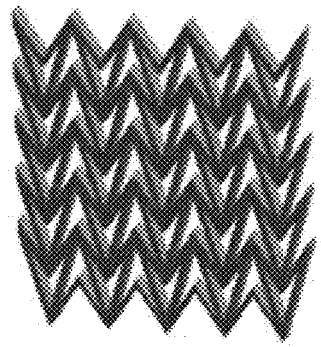
Figure 2F:
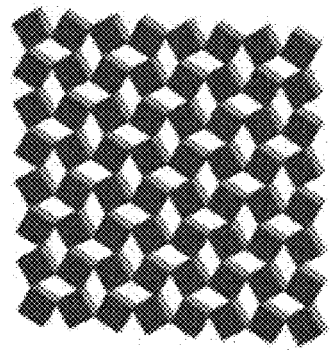
Figure 2G:
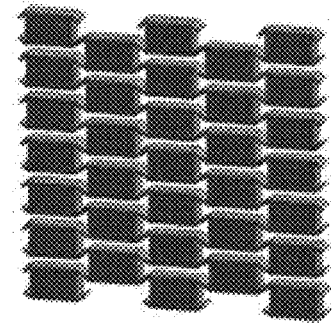
Figure 7:
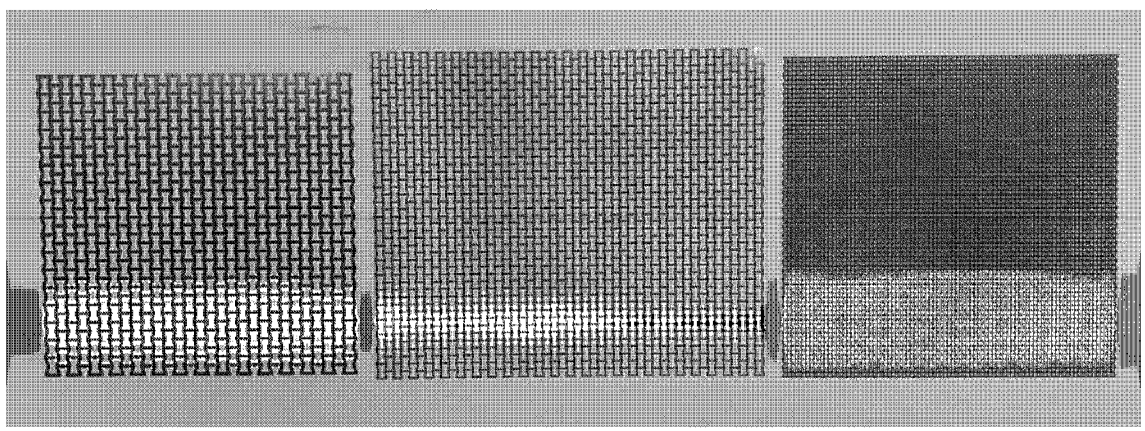
FIG. 7 is a photograph illustrating top sides of two-dimensional auxetic face sheets manufactured according to the exemplary embodiment of the present disclosure.

FIG. 7 is a photograph illustrating top sides of the three-dimensional auxetic face sheets 120a and 120b manufactured according to the exemplary embodiment of the present disclosure. The two-dimensional auxetic pattern illustrated in FIG. 2D is engraved on a stainless-steel sheet having a thickness of 0.2 mm by performing photolithography on a sheet-shaped base material made of metal. In FIG. 7, the sizes of the two-dimensional auxetic patterns are adjusted depending on usage. The photolithography is generally used for a process of processing printed circuit boards for electronic products and is suitable for mass production of precise patterns. After printing a pattern on a surface of a metal plate by photolithography, the exposed metal part is chemically etched and removed. Meanwhile, in the case of a polymer or ceramic material, which is a material of a sheet-shaped base material but is not suitable for the photolithography and etching methods, the two-dimensional auxetic pattern may be implemented by performing linear cutting processing using a laser, an electron beam, discharge, or a water jet or performing mechanical processing such as press forming.

Figure 2H:
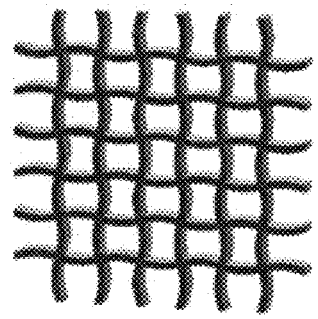
Figure 3A:
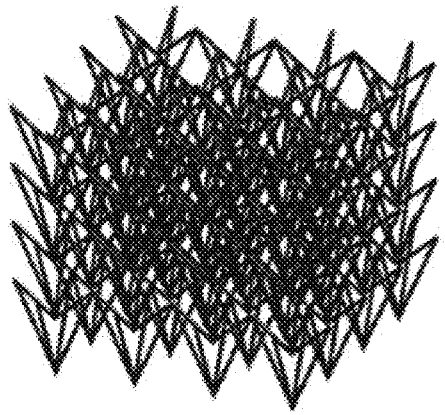
FIGS. 3A to 3D are structural views illustrating three-dimensional auxetic materials according to examples known in the related art.
Figure 3B:
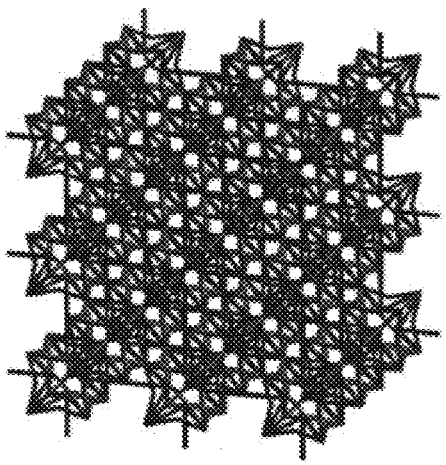
Figure 3C:
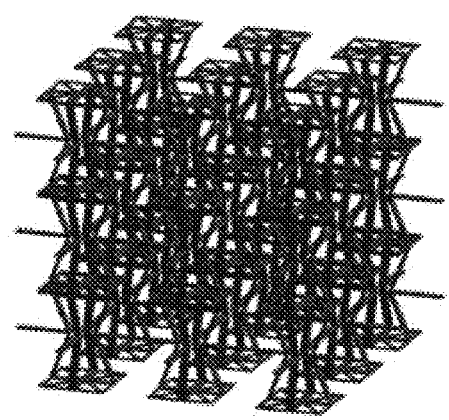
Figure 3D:
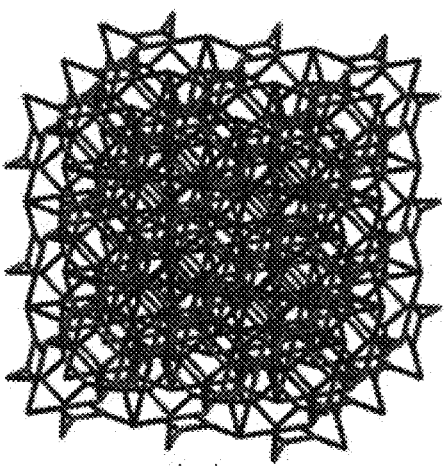
Figure 4A:
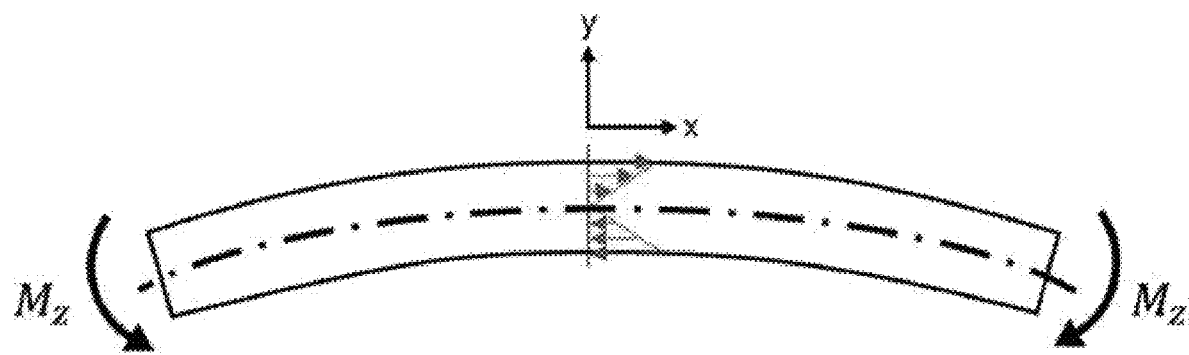
FIGS. 4A to 4C are schematic views illustrating deformation for implementing synclastic curvature deformation characteristics when z-direction bending moment is applied.
Figure 4B:
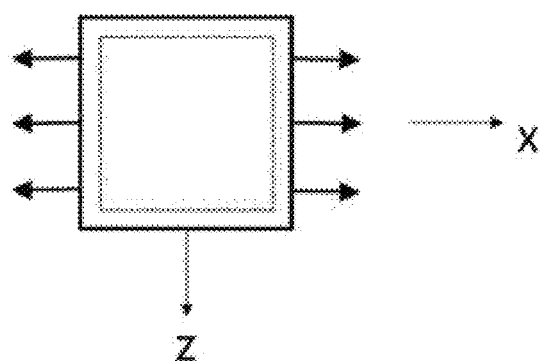
Figure 4C:
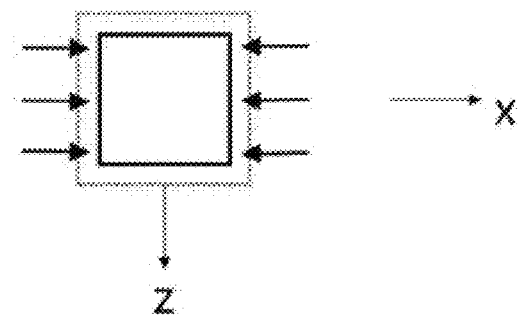
Figure 8A:
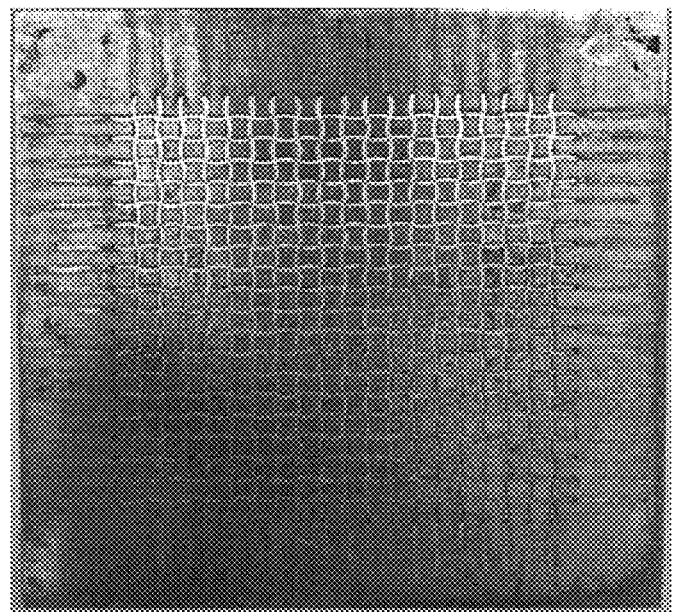
FIGS. 8A and 8B are photographs illustrating top sides of two-dimensional auxetic face sheets manufactured according to another exemplary embodiment of the present disclosure.
Figure 8B:
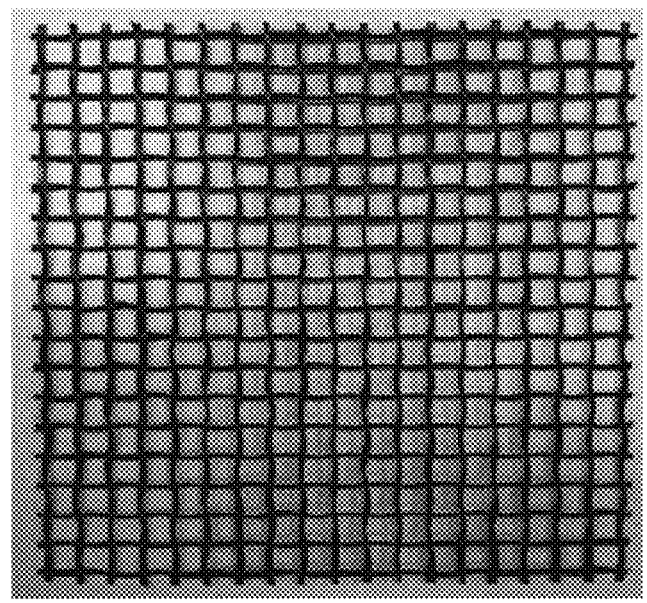

FIGS. 8A and 8B are photographs illustrating top sides of the two-dimensional auxetic face sheets 120a and 120b manufactured according to another exemplary embodiment of the present disclosure. FIG. 8A illustrates another example of the two-dimensional auxetic face sheets 120a and 120b according to the exemplary embodiment of the present disclosure. A plurality of thinly cut unidirectional prepreg wires is plain-woven to form a net shape having a certain period, and then forcibly inserted into a mold in which the two-dimensional auxetic pattern illustrated in FIG. 2H is engraved, as illustrated in FIG. 8B, such that the wires are deformed to be curved. Further, the wires are heated and hardened to obtain the composite material face sheets 120a and 120b in the form of a net. In addition, a small amount of ultra-low-viscosity epoxy is applied onto a cross joint portion between the composite wires, and then the wires are heated again and hardened, thereby preventing shear deformation from occurring between the intersecting prepregs. In this case, the wires may be woven with one another to increase the bonding force between the bidirectional composite materials.

Meanwhile, in addition to the method of weaving the unidirectional composite material illustrated in FIGS. 8A and 8B, the processing of the two-dimensional auxetic face sheets 120a and 120b may use a method of forming a so-called angle-ply laminate structure by laminating the unidirectional composite material prepregs specifically in a inclined direction (Z. Wang, A. Zulifqar, H. Hu, Auxetic composites in aerospace engineering, 2016). The production of the two-dimensional auxetic material having the angle-ply laminate structure uses a specially designed lamination method to implement the auxesis in an in-plane or out-of-plane direction using dedicated software, and the two-dimensional auxetic material manufactured to have the auxesis in the in-plane direction may be used and applied to the present disclosure.

Figure 9:
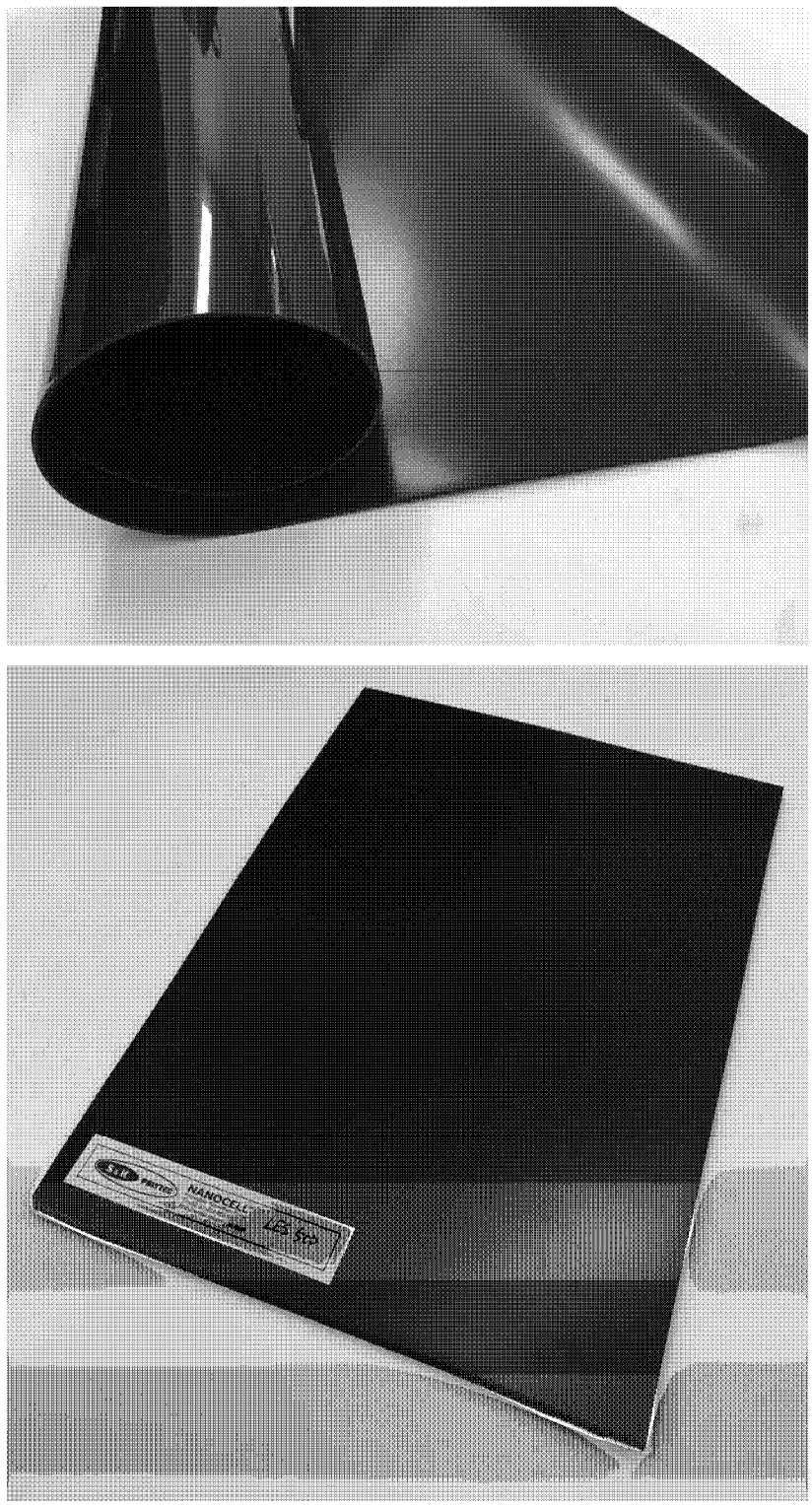
FIG. 9 is a photograph illustrating sheet-shaped urethane foam that constitutes the sandwich panel according to the exemplary embodiment of the present disclosure.
Figure 10:
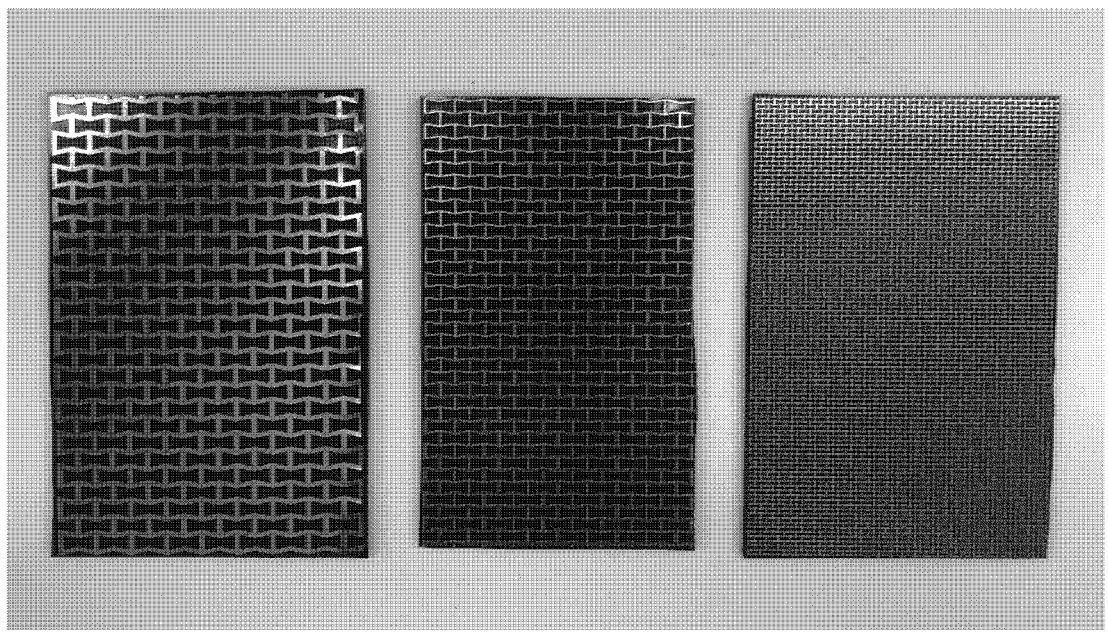
FIG. 10 is a photograph illustrating a sandwich panel made by applying a core illustrated in FIG. 9 and a face sheet illustrated in FIG. 7 according to the exemplary embodiment of the present disclosure.
Figure 11:
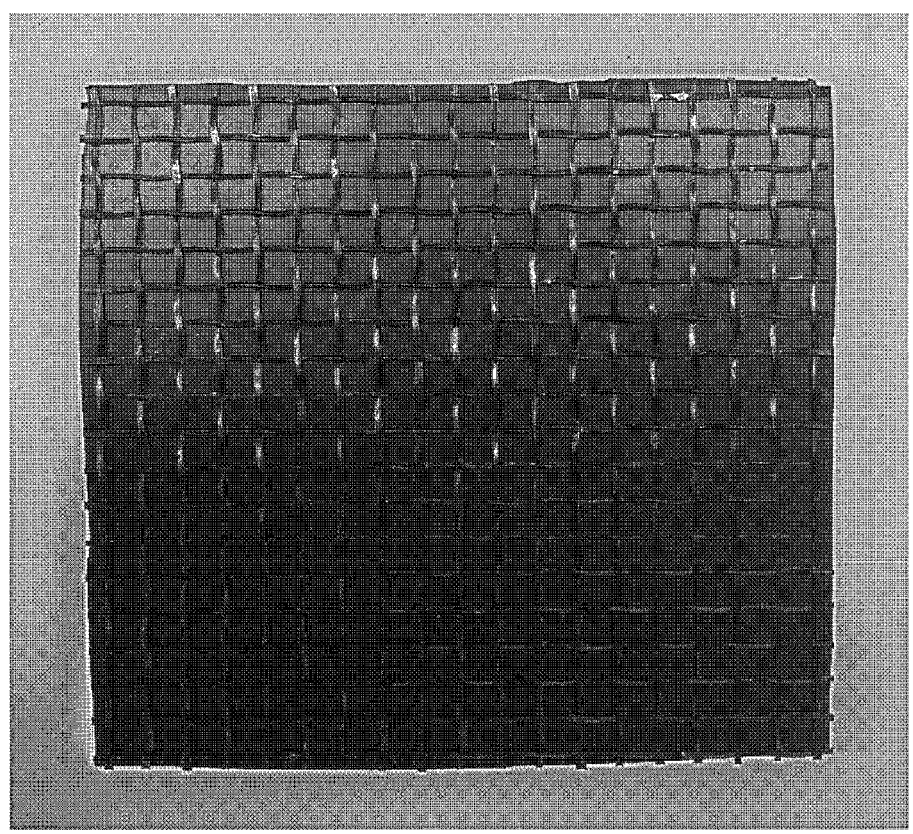
FIG. 11 is a photograph illustrating a sandwich panel made by applying the core illustrated in FIG. 9 and a face sheet illustrated in FIGS. 8A and 8B according to the exemplary embodiment of the present disclosure.

FIGS. 9 and 10 illustrate examples of actual implementations of the core 110 and the sandwich panel 10 according to the exemplary embodiment of the present disclosure, respectively. FIG. 9 is a photograph illustrating actual urethane foam as the sheet-shaped polymer face sheets 120a and 120b used for the core 110, and FIG. 10 is a photograph illustrating the actual sandwich panel 10 completely manufactured by attaching, by epoxy rolling, the metal face sheets 120a and 120b illustrated in FIG. 7 to the core 110 illustrated in FIG. 9. FIG. 11 is a photograph illustrating the actual sandwich panel 10 completely manufactured by attaching, to the core 110 illustrated in FIG. 9, the face sheets 120a and 120b which are illustrated in FIGS. 8A and 8B and manufactured by weaving (plain-weaving) the unidirectional composite materials.

As described above, since the sandwich panel 10 according to the present disclosure has the configuration in which the two-dimensional auxetic materials, as the face sheets 120a and 120b, are attached to both surfaces of the conventional core 110, it is possible to manufacture the light weight/thin sandwich panel, provide predetermined strength and rigidity, and improve adhesion to an adherend by providing behavior of synclastic curvature deformation, in response to bending moment, comparable to the behavior of the three-dimensional auxetic material, such that the sandwich panel may be advantageously used as a structural material for a body wearable device. In addition, since the sandwich panel is simply manufactured at a low cost by pre-processing the two-dimensional auxetic materials in the form of the face sheets 120a and 120b, and simply attaching the two-dimensional auxetic materials to the conventional core 110 and since it is possible to provide behavior comparable to the behavior of the three-dimensional auxetic material, it is possible to easily overcome the practical limitation in that in the case of simply configuring a sandwich panel with a thin plate-shaped structural material using a three-dimensional auxetic material in the related art, manufacturing difficulty is increased, and strength of the structural material is excessively decreased, which obstructs the application of the auxetic material to the body wearable device. In addition, the metal face sheets 120a and 120b may have a beautiful external shape implemented by using an inherent pattern having inherent gloss and an auxetic structure. The mechanical and physical properties may be easily adjusted depending on combinations of materials and structures of the face sheets 120a and 120b and the core 110, and the sandwich panel is remarkably easy to manufacture. Further, the use of the conductive face sheets 120a and 120b may provide a blocking function or the conductive face sheets 120a and 120b may also be used as an antenna for a mobile device and thus may receive radio signals.

The above description relates to the specific exemplary embodiments of the present disclosure. The exemplary embodiments according to the present disclosure are disclosed for the purpose of explanation but are not understood as limiting the scope of the present disclosure, and it should be understood that various alterations and modifications may be made by those skilled in the art without departing from the subject matter of the present disclosure. Therefore, all of the modifications and the alterations may be understood as falling into the scope of the invention disclosed in the claims or the equivalents thereof.

The invention claimed is:

1. A sandwich panel comprising:
a core having surfaces opposite to each other; and
face sheets each attached to each of the surfaces of the core, wherein each face sheet is made of a two-dimensional auxetic material having a negative Poisson's ratio and isotropically stretchable or contractable on a plane when a bending moment is applied in a direction perpendicular to the plane, and
wherein each face sheet has higher density, strength, and rigidity than the core such that the sandwich panel has synclastic curvature deformation characteristics.

2. The sandwich panel of claim 1, wherein the core has a neutral surface in accordance with bending moment.

3. The sandwich panel of claim 1, wherein the core is made of a porous material.

4. The sandwich panel of claim 1, wherein the core is made of any one of polymer, ceramic, and metal.

5. The sandwich panel of claim 1, wherein each face sheet is made of metal, polymer, ceramic, or a composite material.

6. A method of manufacturing a sandwich panel, the method comprising:
preparing a core having surfaces opposite to each other;
processing face sheets; and
attaching each face sheet to each of the surfaces of the core,
wherein each face sheet is processed to have higher density, strength, and rigidity than the core and to have a two-dimensional auxetic structure having a negative Poisson's ratio and isotropically stretchable or contractable on a plane when a bending moment is applied in a direction perpendicular to the plane such that the sandwich panel has synclastic curvature deformation characteristics.

7. The method of claim 6, wherein the processing of the face sheets each having the two-dimensional auxetic structure is performed by performing linear cutting processing using a laser, an electron beam, discharge, or a water jet, or performing photolithography, press processing, or etching on a sheet-shaped base material.

8. The method of claim 6, wherein the processing of the face sheets each having the two-dimensional auxetic structure is performed by weaving a unidirectional composite material or forming an angle-ply laminate structure.

* * * * *